March 16, 1965   D. R. VERSHBOW   3,173,546
DISH CART

Filed July 1, 1963   2 Sheets-Sheet 1

INVENTOR.
DANIEL R. VERSHBOW
BY
*Conway, Jenney & Hildreth*
ATTORNEYS

March 16, 1965 D. R. VERSHBOW 3,173,546
DISH CART

Filed July 1, 1963 2 Sheets-Sheet 2

INVENTOR.
DANIEL R. VERSHBOW
BY
ATTORNEYS

United States Patent Office 3,173,546
Patented Mar. 16, 1965

---

3,173,546
DISH CART
Daniel R. Vershbow, West Newton, Mass., assignor to Serv-O-Lift Corporation, Dorchester, Mass., a corporation of Massachusetts
Filed July 1, 1963, Ser. No. 291,994
6 Claims. (Cl. 211—41)

This invention comprises a new and improved dish cart for use in hotels, restaurants, stock rooms or wherever it is desired to move quickly and safely a substantial number of dishes without noise or clatter.

For such purposes it is desirable to provide a cart or mobile unit of large capacity with provision for making therein secure cradles for an assortment of dishes of various sizes, from dinner plates to butter dishes. It is moreover desirable that provision be made for convenient adjustment of the dish supporting elements of the cart to accommodate stacks of different diameters and at times to vary the location of different stacks within the enclosure of the cart.

The dish cart of my invention has all these advantages and others which will appear from the following description of a preferred embodiment thereof selected for purposes of illustration and shown in the accompanying drawings in which—

Figure 5:
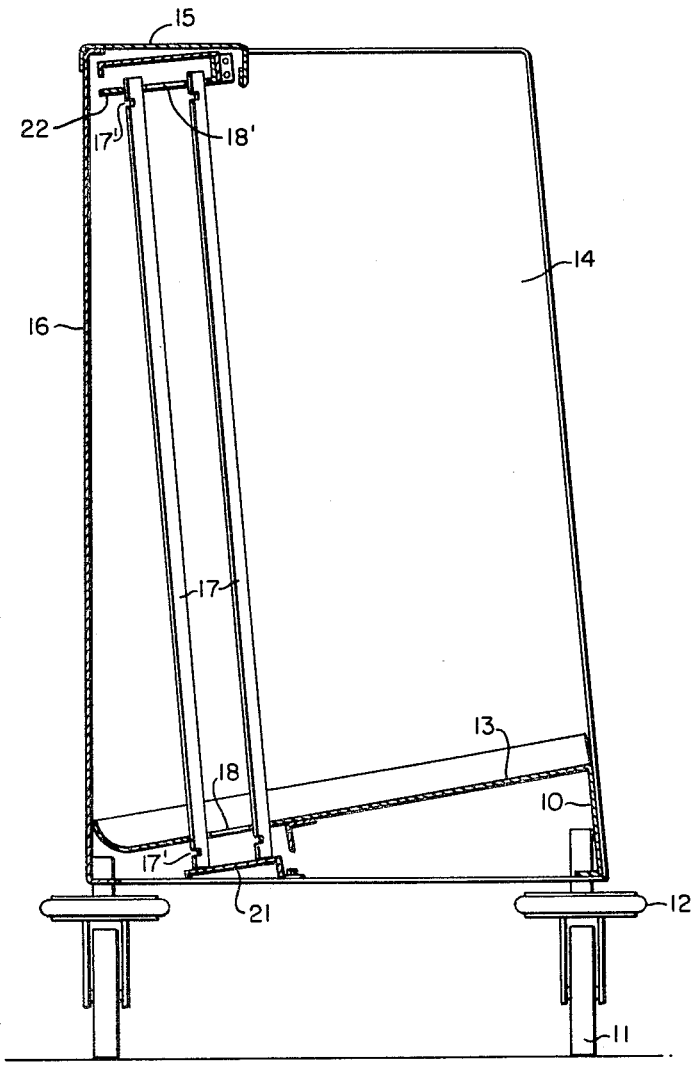
FIG. 5 is a view in longitudinal section on the line 5—5 of FIG. 1.

The dish cart as herein shown comprises a rectangular base 10 supported on swivel wheels 11 protected by circular bumpers 12. The floor 13 of the base is inclined rearwardly and downwardly at a slight angle as shown in FIG. 5 and above this is an open front enclosure formed by side walls 14, a top wall 15 and back wall 16.

Figure 3:
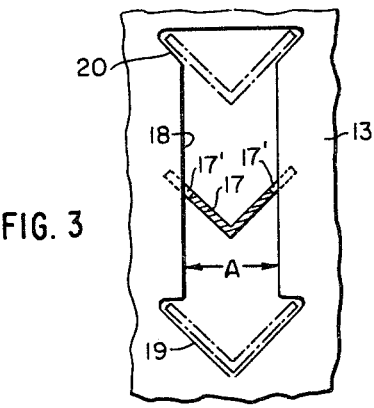
FIGS. 3 and 4 are fragmentary views on an enlarged scale of details of the construction.
Figure 4:
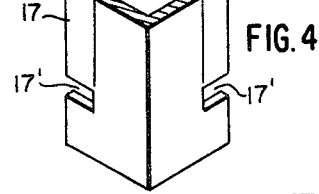

Within the enclosure thus formed are mounted four groups of upright dish-supporting bars or rods 17. These are V-shaped or right angular in cross section as shown in FIGS. 3 and 4, thus being of maximum stiffness consistent with light weight. Each rod is provided adjacent to both ends with a pair of notches 17' which form a section of reduced width such as that marked A in FIG. 4.

The rods 17 are maintained in upright position by extending through slots 18 which are formed in the floor 13, and slots 18' in a head bracket 22 secured in position beneath the top wall 15. Slots 18 extend from front to rear and are provided at their forward ends with a V-shaped aperture 19 and at their rear ends with an aperture 20 of the same shape. The width of the slots 18 as indicated in FIG. 3 corresponds to the width of the reduced section of each rod marked A in FIG. 4, while the terminal apertures 19 and 20 are of sufficient size to permit the free movement thereto of the rods 17. The slots 18' in the head bracket 22 are of corresponding size and position.

From the foregoing description it will be apparent that all the rods 17 may be initially located in parallel relation at the back of the enclosure by being passed through the rear apertures 20 of the slots 18 and 18'. Any selected rod or group of rods may be moved forwardly by lifting until the reduced section A registers with a slot 18. At this elevation any rod may be moved forward in the slot 18 to any desired position permitted by the length of the slot. Further any rod 17 may be moved forwardly to the aperture 19 at the forward end of the slot and then dropped into position upon a supporting foot bracket 21.

Figure 1:
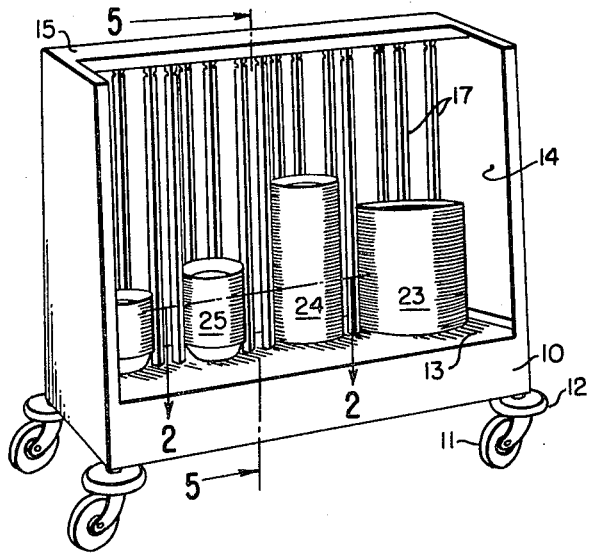
FIG. 1 is a view in perspective of the cart.
Figure 2:
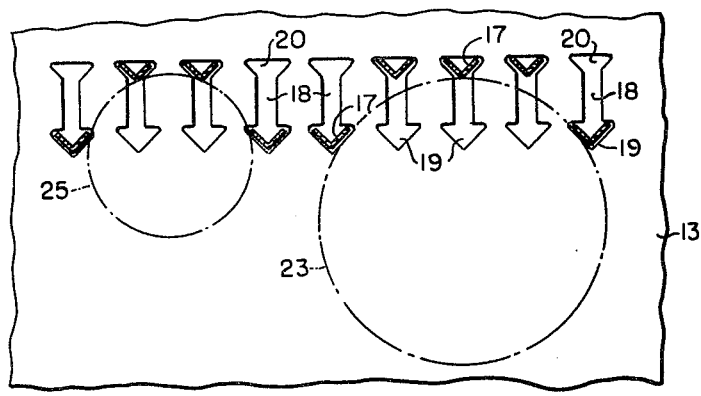
FIG. 2 is a fragmentary view on cross section on the line 2—2 of FIG. 1.

In FIG. 2 the first and fifth rods 17 from the right are shown in this forward position and the group is thus adjusted to accommodate dinner plates of the stack 23. The four rods at the left in FIG. 2 are shown as adjusted to accommodate saucers of the stack 25. In FIG. 1 is also shown a stack 24 of dessert plates.

When the rods 17 are all located in the rear apertures 20 the floor 13 is clear to receive tote boxes or other articles for transportation.

While the rods 17 are herein shown as V-shaped in cross section it will be apparent that rods of any tubular light-wight construction may be employed within the scope of the invention. Also, in many cases a single pair of rods, such as the first and fifth from the right in FIG. 2, will be entirely sufficient to locate a stack without the assistance of any intermediate rods.

Having thus disclosed my invention and described in detail an illustrative embodiment thereof, I claim as new and desire to secure by Letters Patent:

1. A mobile dish cart having walls forming an upright enclosure with an open front, a bottom having a transverse row of slots therein, and a series of guide bars mounted in the enclosure and having notches defining in each bar a section of less width than the width of the said slots.

2. A mobile dish cart as defined in claim 1, further characterized in that an imperforated foot bracket is contained in the bottom below the slots thereof for limiting the downward movement of the guide bars.

3. A mobile dish cart as defined in claim 1, further characterized in that a head bracket is contained in the top of the enclosure for limiting the upward movement of the guide bars.

4. A mobile dish cart as defined in claim 1, further characterized in that a head bracket is contained in the top of the enclosure and has slots registering with those of the bottom for the reception of the top ends of the guide rods.

5. A dish cart having a bottom in which is formed a series of spaced slots connecting larger perforations at each slot end, and guide bars, each having a body wider than the slots with notches defining in each bar a section of less width than that of the notches.

6. A dish cart having walls forming an open-front enclosure and a series of upright guide bars each having a reduced section therein, sheet metal members at the top and bottom of the enclosure having parallel slots shaped to fit the reduced section of the rods and merging into enlarged end apertures permitting free removal of the rods, and a foot bracket located below the bottom sheet metal member in supporting relation to the guide bars in the slots.

References Cited by the Examiner

UNITED STATES PATENTS 653,699   7/00   Robinson _____ 211—49
2,246,457   6/41   Schultz _____ 248—234

OTHER REFERENCES

"Dispensator Division Bulletin," published in 1957 by W. H. Frick, Inc., Cleveland, Ohio.

CLAUDE A. LE ROY, *Primary Examiner.*